(12) United States Patent
Czerr et al.

(10) Patent No.: US 9,463,677 B2
(45) Date of Patent: Oct. 11, 2016

(54) WHEEL SUSPENSION

(71) Applicant: Benteler Automobiltechnik GmbH, Paderborn (DE)

(72) Inventors: Siegmund Czerr, Bielefeld (DE); Stephan Meyer, Bielefeld (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/752,183

(22) Filed: Jun. 26, 2015

(65) Prior Publication Data
US 2015/0375588 A1 Dec. 31, 2015

(30) Foreign Application Priority Data
Jun. 27, 2014 (DE) .................. 10 2014 109 038

(51) Int. Cl.
*B60G 3/20* (2006.01)
*B60G 7/00* (2006.01)

(52) U.S. Cl.
CPC ............ *B60G 3/20* (2013.01); *B60G 3/202* (2013.01); *B60G 7/001* (2013.01); *B60G 7/008* (2013.01); *B60G 2200/182* (2013.01); *B60G 2204/1244* (2013.01); *B60G 2204/148* (2013.01); *B60G 2204/41* (2013.01); *B60G 2204/44* (2013.01); *B60G 2206/017* (2013.01); *B60G 2206/11* (2013.01); *B60G 2206/14* (2013.01); *B60G 2206/16* (2013.01); *B60G 2206/50* (2013.01); *B60G 2206/722* (2013.01); *B60G 2206/8201* (2013.01)

(58) Field of Classification Search
CPC .. B60G 7/008; B60G 3/202; B60G 2206/14; B60G 2206/017; B60G 2200/182
See application file for complete search history.

(56) References Cited

U.S. PATENT DOCUMENTS 3,292,944 A * 12/1966 Dangauthier ............ B60G 3/20
280/124.107
4,722,540 A * 2/1988 Kozyra .................. B60T 1/065
180/253

(Continued)

FOREIGN PATENT DOCUMENTS

CN 202378655 U 8/2012
DE 29519965 U1 4/1997
(Continued)

OTHER PUBLICATIONS

Watanabe et al., Suspension Device, Jan. 16, 2014, JPO, JP 2014-004953 A1, Machine Translation of Description.*

(Continued)

Primary Examiner — James English
(74) Attorney, Agent, or Firm — Hauptman Ham, LLP

(57) ABSTRACT

A wheel suspension for a motor vehicle is disclosed having a wheel carrier and having multiple links which are each connected to the wheel carrier by way of a link attachment. The wheel carrier has a shell body composed of sheet metal and includes a base and a side wall. The shell body is closed off in regions by a cover plate, with the shell body being stiffened in this way. At least one link attachment has a bearing receptacle which is fixed in the side wall of the shell body, and in which a bearing is held. The link is fastened to link attachment, and engages around the bearing receptacle. The bearing receptacle is a sleeve or is formed as a rim hole in the side wall of the shell body.

7 Claims, 6 Drawing Sheets

(56) References Cited

U.S. PATENT DOCUMENTS

| | | | | |
|---|---|---|---|---|
| 4,828,279 | A | * | 5/1989 | Matschinsky ............ B60G 3/26 280/124.143 |
| 5,228,717 | A | | 7/1993 | Perkins |
| 6,138,357 | A | * | 10/2000 | Jones ..................... B62D 7/18 280/93.512 |
| 7,697,310 | B2 | * | 4/2010 | Nakamura ........ H02M 3/33592 363/127 |
| 8,646,787 | B2 | * | 2/2014 | Langhoff ................ B60G 3/20 280/124.134 |
| 8,827,290 | B2 | * | 9/2014 | Schulz .................. B06G 7/001 280/124.135 |
| 8,936,264 | B2 | * | 1/2015 | Koormann ............. B60G 7/001 280/124.151 |
| 9,162,546 | B2 | * | 10/2015 | Girelli Consolaro ......... B60G 21/0551 |
| 9,254,725 | B2 | * | 2/2016 | Okuyama ................ B60G 3/20 |
| 2002/0074759 | A1 | * | 6/2002 | Yamamoto ............. B60G 3/202 280/124.128 |
| 2009/0160154 | A1 | * | 6/2009 | Frasch .................... B60G 3/20 280/124.143 |
| 2010/0320711 | A1 | * | 12/2010 | Siebeneick ............. B60G 3/06 280/124.125 |
| 2012/0043736 | A1 | * | 2/2012 | Okamoto ................ B60G 3/20 280/124.135 |
| 2013/0147144 | A1 | | 6/2013 | Lee et al. |
| 2013/0249182 | A1 | * | 9/2013 | Moessinger ........... B60G 7/008 280/124.135 |
| 2014/0300074 | A1 | * | 10/2014 | Koormann ............. B60G 7/001 280/124.151 |
| 2014/0353937 | A1 | * | 12/2014 | Girelli Consolaro ......... B60G 21/0551 280/124.128 |
| 2015/0008654 | A1 | * | 1/2015 | Haselhorst ............. B60G 7/001 280/124.128 |

FOREIGN PATENT DOCUMENTS

| | | |
|---|---|---|
| DE | 29819912 U1 | 3/1999 |
| DE | 19915633 A1 | 10/2000 |
| DE | 19931018 A1 | 1/2001 |
| DE | 10346280 A1 | 5/2005 |
| DE | 102004021884 A1 | 12/2005 |
| DE | 102010027752 A1 | 10/2011 |
| DE | 102011007831 A1 | 10/2012 |
| DE | 102011112057 A1 | 3/2013 |
| EP | 1216858 A2 | 6/2002 |
| FR | 2813239 A1 | 3/2002 |
| JP | H0986126 A | 3/1997 |
| JP | 2002316228 A | 10/2002 |
| JP | 2014004953 A | 1/2014 |
| KR | 20030024378 A | 3/2003 |
| KR | 1020100045789 A | 5/2010 |
| KR | 1020130067446 A | 6/2013 |
| WO | 2011023871 A1 | 3/2011 |

OTHER PUBLICATIONS

Watanabe et al., Suspension Device, Jan. 16, 2014, JPO, JP 2014-004953 A1, English Abstract.*

Jukel, Wheel Support on motor vehicle axles consists of two shell-shaped parts welded together to form hollow housing with internal distance elements, Jan. 11, 2001, EPO, DE 199 310 018 A1, Machine Translation of Description.*

Adamczyk, Motor Vehicle comprising at least one wheel-supporting structural unit, Oct. 25, 2012, EPO, DE 10 2011 007 831 A1, Machine Translation of Description.*

* cited by examiner

WHEEL SUSPENSION

CROSS-REFERENCE TO RELATED APPLICATIONS

This application claims the benefit of Germany Application No. 10 2014 109 038.1, filed Jun. 27, 2014, which is incorporated herein by reference in its entirety.

The invention relates to a wheel suspension for a motor vehicle, having a wheel carrier, as per the features in the preamble of claim 1.

The wheel suspension is a constituent part of the running gear of a motor vehicle and forms the kinematic coupling to the motor vehicle wheel, such that the wheel is movable relative to the motor vehicle body and can perform compressing and decompressing movements. The term "wheel carrier" refers to those parts of the running gear of a motor vehicle on which the wheels are mounted by way of the wheel bearing. The wheel is rotatably mounted on a wheel carrier, and the wheel carrier, as a coupling element of the kinematic chain, is individually connected to the body by way of multiple links.

It is known for wheel carriers to be formed as cast or forged parts. Such wheel carriers are stable and can be very easily machined in order to be provided with bores for link attachments and the like. Such wheel carriers are however relatively heavy, which can have an adverse effect both on fuel consumption and on suspension characteristics.

DE 10 2010 027 752 A1 presents a prior-art wheel carrier which is formed at least predominantly as a cast or forged body.

DE 103 46 280 A1 has disclosed a wheel carrier which is likewise formed as a forged part or cast part. Link attachment points are bridged by way of a strut arrangement formed integrally with the wheel carrier. The strut arrangement serves to stiffen the wheel carrier, such that the wheel carrier may also be manufactured from light metal, whereby weight is saved.

Assembled wheel carriers composed of multiple welded-together shell-like components are also known.

DE 295 19 965 U1 presents a prior-art motor vehicle wheel carrier for multi-link axles. The wheel carrier is a hollow body formed from an inner shell and an outer shell, wherein, in the region of the wheel fastening, the inner shell and the outer shell lie against one another and are connected to one another by welded connections. Transverse-link attachments are integrally formed on the outer shell, wherein the transverse-link attachments of the outer shell surround the transverse link in U-shaped fashion.

DE 10 2011 007 831 A1 describes a wheel-carrying structural unit which has a wheel carrier region, which supports a wheel bearing, and a flange region, by way of which the structural units can be attached indirectly or directly to a spring strut or similar element designed for suspension and/or damping. The structural unit comprises a deformed, unipartite sheet-metal body, of which the wheel carrier region and the flange region are integral parts.

DE 10 2004 021 884 A1 discloses a wheel carrier for a motor vehicle having a first and a second shell-like component which are connected to one another and which between them form a cavity and which have bearing arrangements for wheel control links and a spring strut. The shell-like components are connected to one another at the edges by way of flanged portions. Deformations of the components are prevented by way of internal supports in the region of the bearing arrangements.

The wheel carrier known from DE 199 31 018 A1 is also formed from two shell-like components. These are connected to one another by way of welded connections and enclose a cavity. Within the cavity there is provided a spacer element which is in the form of a spacer sleeve.

In the case of assembled wheel carriers composed of sheet steel, the interface between the wheel carrier and the links, in particular spring links or transverse links, is not always easy to realize owing to the complex geometry and installation space availability. For the elastic attachment of the link to the wheel carrier, a bearing, in particular a roller bearing, is inserted into the link attachment.

Taking the prior art as a starting point, the invention is based on the object of specifying a wheel carrier which is improved with regard to structural space and stiffness characteristics and which permits inexpensive and straightforward attachment between wheel carrier and link, in particular spring link.

Said object is achieved, according to the invention, by way of a wheel suspension for a motor vehicle having a wheel carrier as per the features of claim 1.

Dependent claims relate to advantageous embodiments and refinements of the wheel suspension according to the invention.

The wheel suspension has a wheel carrier and multiple links which are each connected to the wheel carrier by way of a link attachment. The wheel carrier comprises a shell body which is composed of sheet metal and which has a base and a side wall. At least one link attachment has a bearing receptacle which is fixed in the side wall of the shell body. In the bearing receptacle there is held a bearing, wherein the link which is fastened to said link attachment engages around the bearing receptacle.

The invention is characterized by the small amount of structural space required at the interface between wheel carrier and link, in particular spring link. The wheel carrier exhibits high stiffness and a small structural space requirement. The tooling costs are also lower in relation to those for known wheel carriers.

A major aspect and advantage of the invention furthermore consists in that different track widths can be easily realized in the wheel suspension at the wheel carrier. This is achieved by way of the position of the link attachment in the side wall of the shell body. Expensive auxiliary tools are not required for this purpose. It is an advantage in particular that the spring link does not need to be modified. This is an advantage in particular if, within a vehicle series for different vehicle models based on the same platform, either sheet-steel wheel carriers or cast wheel carriers are provided owing to different design emphases. Regardless of whether the wheel carrier is a sheet-metal component as per the invention or a cast component, the spring link can remain unchanged.

Within the kinematic chain, the forces are conducted and transmitted between the wheel carrier and the links. The wheel carrier satisfies the elastokinematic requirements while allowing for the small structural space availability, which is generally dependent on the wheel rim diameter, and furthermore exhibits high stiffness.

A major aspect and advantage of the invention is that the bearing is received in the side wall of the wheel carrier.

One aspect of the invention provides that the bearing receptacle is a sleeve. In another embodiment of the invention, the bearing receptacle is formed by a rim hole in the side wall of the shell body. The bearing is a rubber bearing. The rubber bearing is preferably pressed into the bearing receptacle.

The bearing receptacle or the sleeve is fixed in an opening in the side wall. The fixing is realized by way of material closure, in particular welding or brazing. As already stated, the bearing receptacle may also be formed by a rim hole provided in the side wall of the shell body. It is basically also possible for a bearing receptacle in the form of a sleeve to be supported in a rim hole in the side wall of the shell body. The stiffness characteristics are additionally improved in this way.

To additionally stabilize the fastening of the bearing receptacle in the side wall, the link attachment may have a support wall parallel to the side wall. The bearing receptacle is additionally held by way of one end in the support wall. The side wall is preferably welded to the shell body.

An advantageous embodiment provides that the shell body is closed off in regions by a cover plate. The wheel carrier is stiffened in this way. The cover plate is materially coupled to the side wall of the shell body at the face side.

Preferably the cover plate has recesses in the region of the link attachment what is conducive to the compact design of the wheel carrier. In particular, the recesses are designed such that end sections or end-side limbs of the links can be led through the recesses in order for the ends of the links to be attached in each case to a link attachment.

To realize a weight reduction and for installation purposes, the cover plate may also have one or more further recesses. These are arranged at locations of the cover plate which are less highly loaded in the force flow.

In the case of the link attachment designed according to the invention, the link that is fastened there engages around the bearing receptacle. The link is of U-shaped or fork-shaped configuration at the end side.

Furthermore, at least one further link attachment may be provided which has two limbs which project from the side wall and between which an end of a link fastened to said link attachment is received by way of a bearing.

A further aspect provides that the wheel fastening is joined to the outside of the base of the shell body. In particular, the wheel fastening is welded there.

The wheel carrier or the shell body, the cover plate and the bearing receptacle are, like the wheel fastening, composed of steel or a steel material.

The invention will be described in more detail below on the basis of exemplary embodiments illustrated in the drawing, in which.

Figure 1:
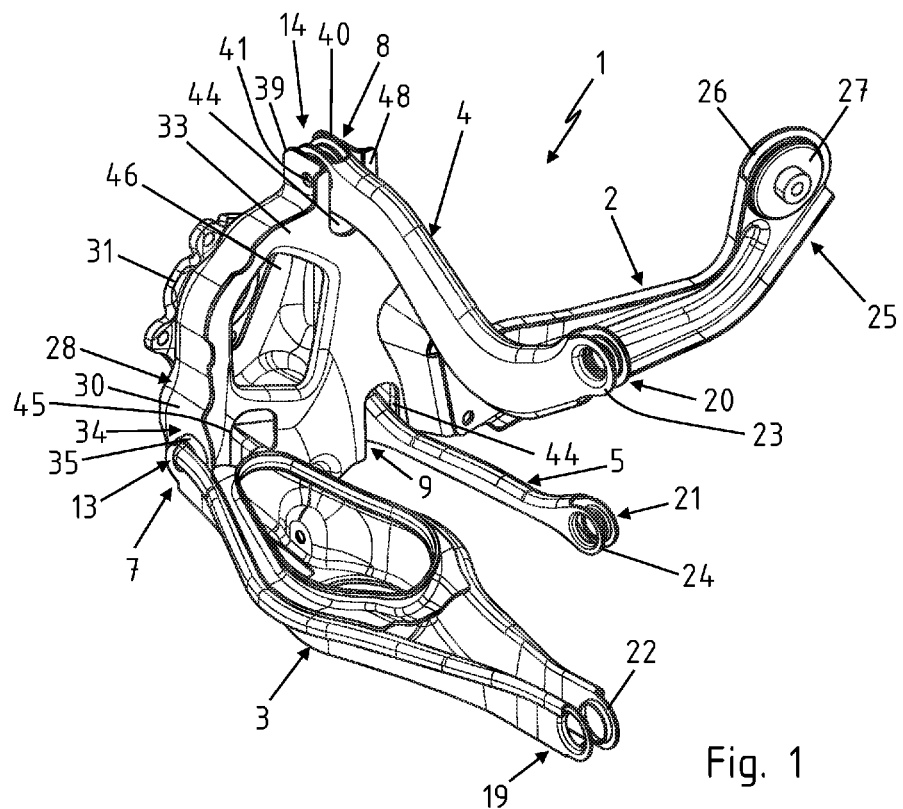
FIGS. 1 to 8 show a wheel suspension according to the invention in different perspectives.
Figure 2:
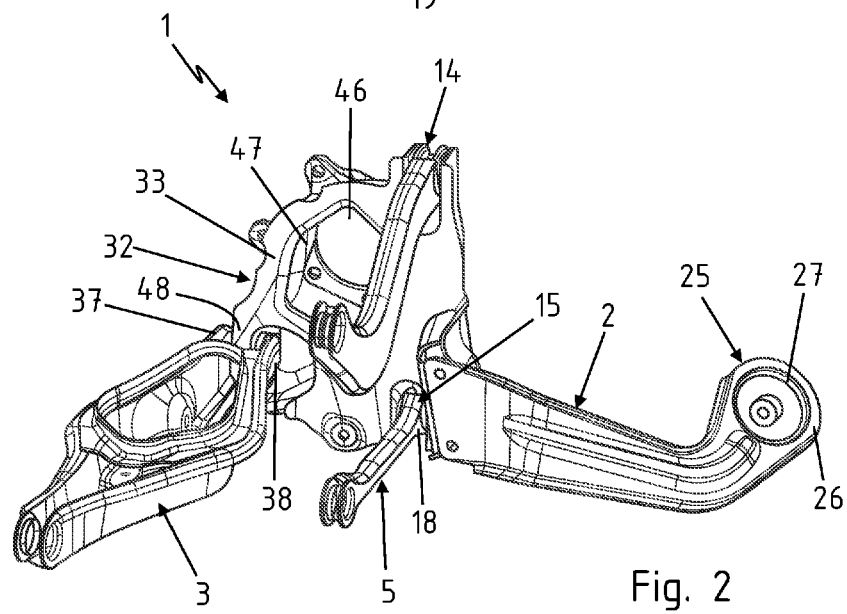
Figure 3:
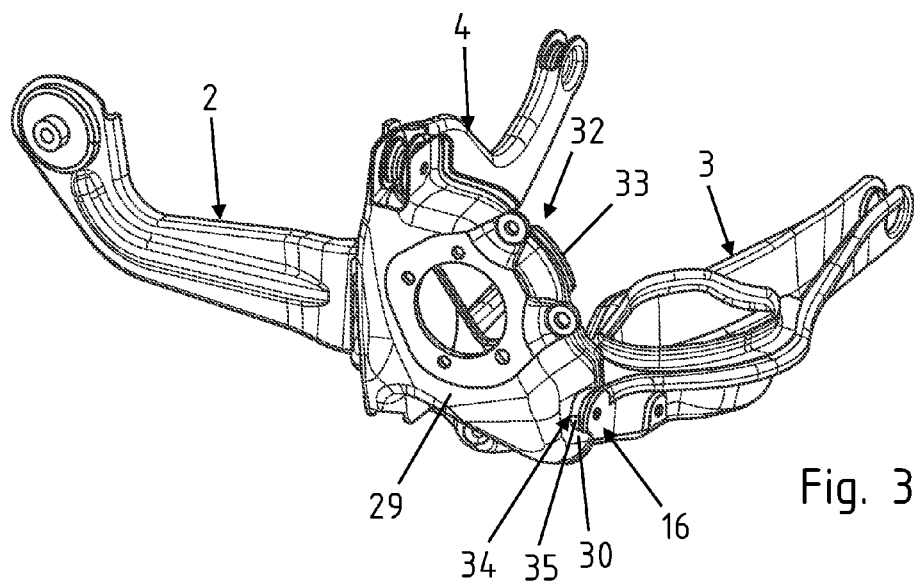
Figure 4:
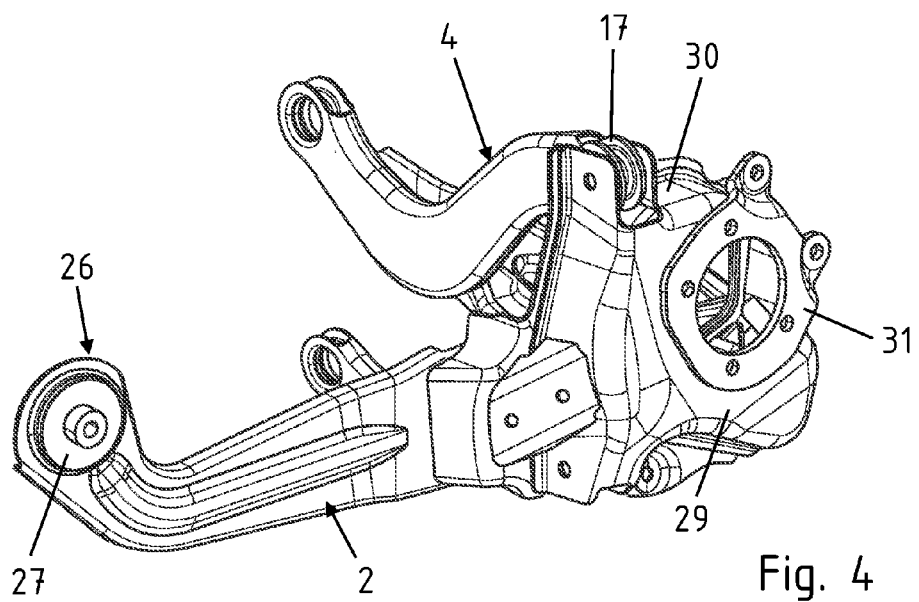
Figure 5:
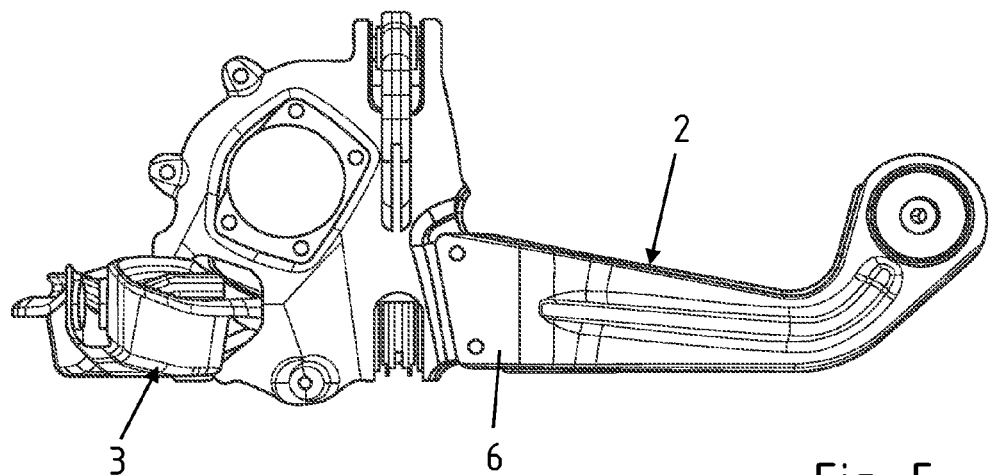
Figure 6:
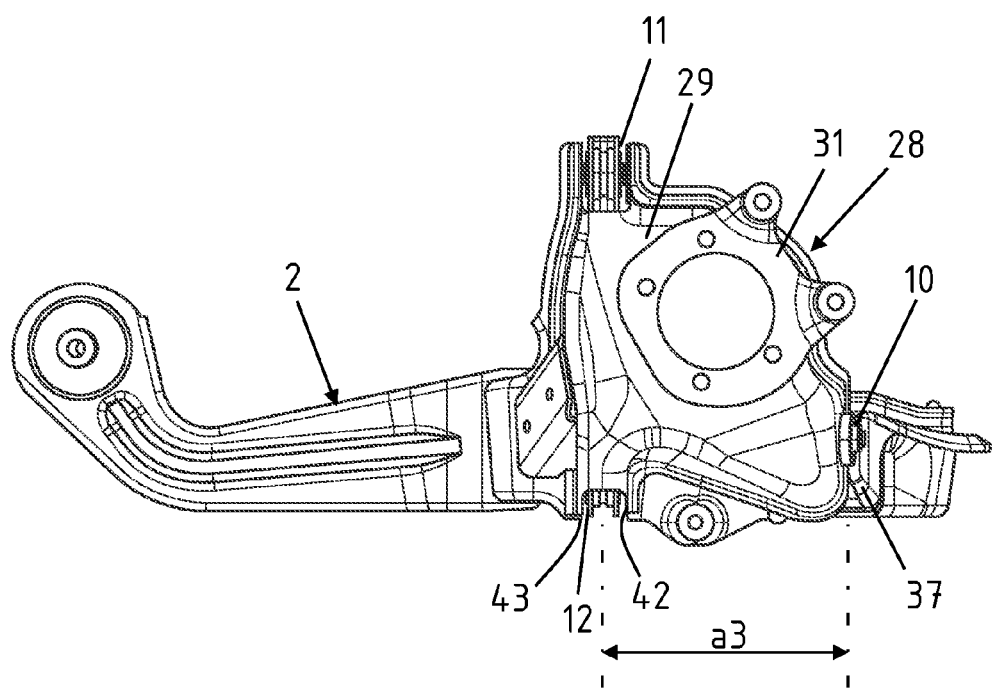

A wheel suspension according to the invention will be described on the basis of FIGS. 1 to 8. The wheel suspension comprises a wheel carrier 1 to which links are attached, specifically a trailing link 2 and a spring link 3, a camber link 4 and a toe link 5.

The trailing link 2 is fixedly connected to the wheel carrier 1 by way of an attachment 6.

The spring link 3 and the upper camber link 4 and the lower toe link 5 are in each case rotatably articulatedly connected to the wheel carrier 1 by way of a link attachment 7, 8, 9 and a bearing 10, 11, 12. In the wheel carrier-side ends 13, 14, 15 of spring link 3, camber link 4 and toe link 5, there are formed corresponding bearing attachments 16, 17, 18. Those ends 19, 20, 21 of the links 3, 4, 5 which are remote from the wheel carrier 1 likewise have bearing attachments 22, 23, 24 in order for the links 3, 4, 5 to be able to be fastened to the running gear (not illustrated here). Also, the longitudinal link 2 has, at its end 25 remote from the wheel carrier 1, a bearing attachment 26 with a bearing 27 received therein.

The wheel carrier 1 has an outer shell body 28 composed of deep-drawn sheet steel. The shell body 28 has a base 29 and a side wall 30. A wheel fastening 31 is joined to the outer side of the base 29 of the shell body 28. On the side 32 situated opposite the wheel fastening 31, a cover plate 33 is fastened to the shell body 28. The cover plate 33 closes off and stiffens the shell body 28 in regions.

The link attachment 7 for the spring link 3 has a bearing receptacle 34 which is in the form of a sleeve 35 and which is arranged in the side wall 30 of the shell body 28. The bearing receptacle 34 is oriented perpendicular to the side wall 30. In the side wall 30 there is provided an opening 36 in which the sleeve 35 is fixed and joined by welding or brazing. The bearing 10 is held in the bearing receptacle 34. The bearing 10 is a rubber bearing. The rubber bearing 10 is pressed into the bearing receptacle 34.

The wheel carrier-side end 13 of the spring link 3 is of U-shaped or fork-shaped configuration. The end 13 has two limbs 37, 38, by means of which the end 13 engages around the bearing receptacle 34. Here, the limbs 37, 38 are positioned in each case to the left and to the right of the bearing receptacle 34.

The bearing attachment 8 of the camber link 4 has two limbs 39, 40 which project from the side wall 30. The end 14 of the camber link 4 together with the bearing 11 are received between the limbs 39, 40 of the bearing attachment 8. For this purpose, bearing bores 41 are provided in the limbs 39, 40, by way of which bearing bores the bearing 11 is coupled to the wheel carrier 1.

The link attachment 9 for the toe link 5 also comprises two limbs 42, 43, which project from the side wall 30 and between which the end 15 of the toe link 5 is received by way of a bearing 12.

In the region of the link attachments 8, 9, the cover plate 33 has recesses 44 for the leadthrough of the ends 14, 15 of the camber link 4 and toe link 5. Furthermore, a recess 45 is provided in the cover plate 33. The limb 38 of the end 13 of the spring link 3 engages through the recess 45 into the shell body 28. Furthermore, a recess 46 is also provided in the cover plate 33. In this way, the overall weight of the wheel carrier 1 is reduced. Furthermore, the recess 46 has advantages in terms of installation, and provides access to the interior 47 of the wheel carrier 1.

The recesses 44, 45 are delimited by wall sections 48 which are supported on and joined to the side wall 30 and the limbs 39, 40, 42, 43 of the shell body 28.

Figure 9:
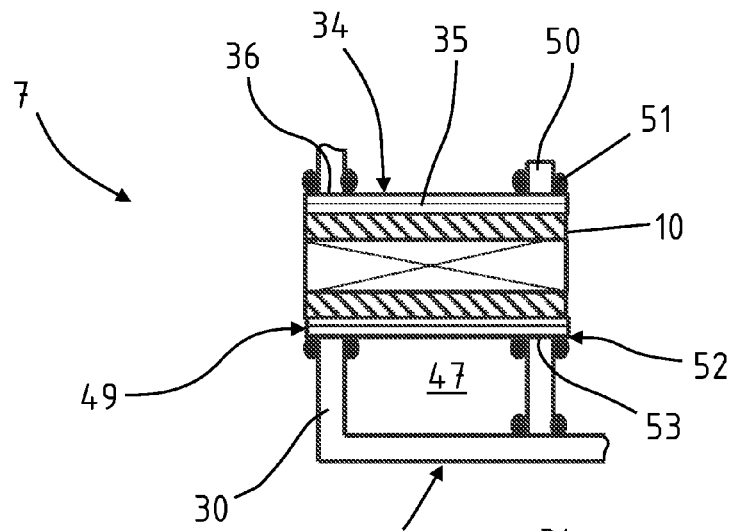
FIG. 9 shows, in a schematic technical drawing, a detail from the region of a first embodiment of a link attachment.

FIG. 9 shows, in a schematic technical drawing, a detail from the region of a first embodiment of the link attachment 7 for the spring link 3. The sleeve 35 which serves as bearing receptacle 34 is fixed by way of one end 49 in an opening 36 of the side wall 30 of the shell body 28 by welding. Parallel to the side wall 30, there is provided in the interior 47 a support wall 50, which is likewise welded to the shell body 28. The joining by welding is illustrated by way of the weld spots 51. The bearing receptacle 34 is held by way of its other end 52 in an opening 53 in the support wall 50, and is likewise joined therein by welding. The bearing 10 is a rubber bearing which is pressed into the sleeve 35.

Figure 10:
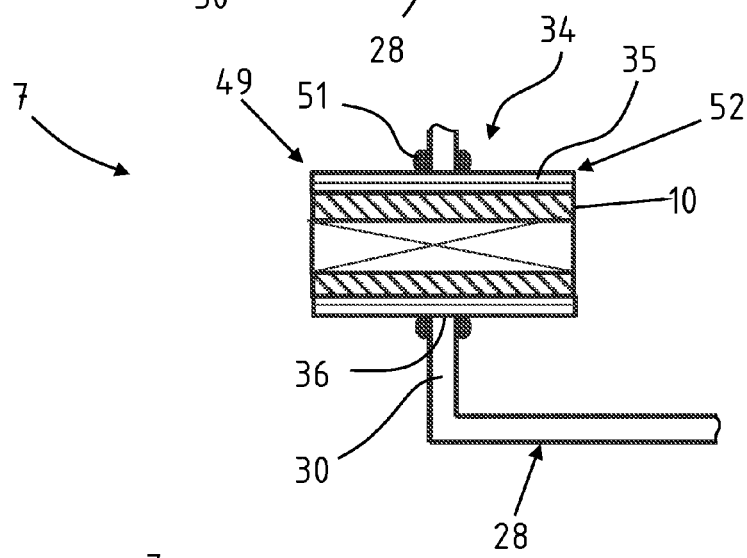
FIG. 10 shows, in a schematic technical drawing, a detail from the region of a second embodiment of a link attachment.

In the embodiment illustrated in FIG. 10, the bearing receptacle 34 in the form of the sleeve 35 is fixed in the opening 36 in the side wall 30 of the shell body 28 and is materially coupled by welding by way of the weld spots or seams 51. The ends 49, 52 of the sleeve 35 project beyond the side wall 30 to both sides.

Figure 11:
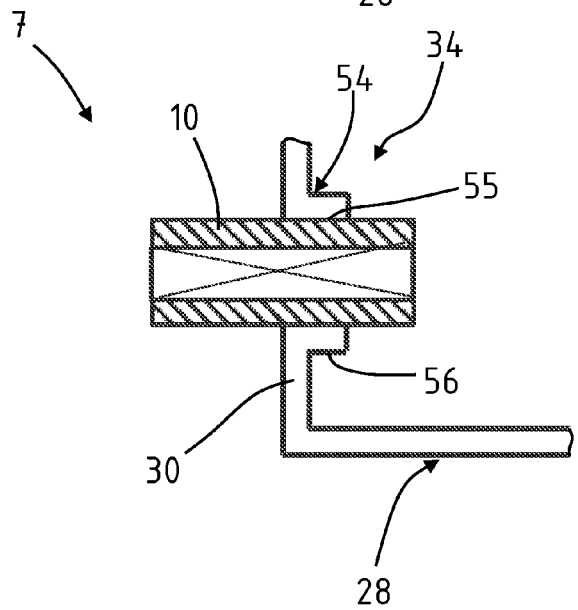
FIG. 11 shows, in a schematic technical drawing, a detail from the region of a third embodiment of a link attachment.

A further embodiment of the link attachment is shown in FIG. 11. The bearing receptacle 34 is formed by a rim hole 54 in the side wall 30 of the shell body 28. The rubber bearing 10 is pressed into the opening 55 in the rim hole 54 and held there by means of an interference fit. The encircling collar 56 of the rim hole 54 supports the bearing 10.

Figure 12:
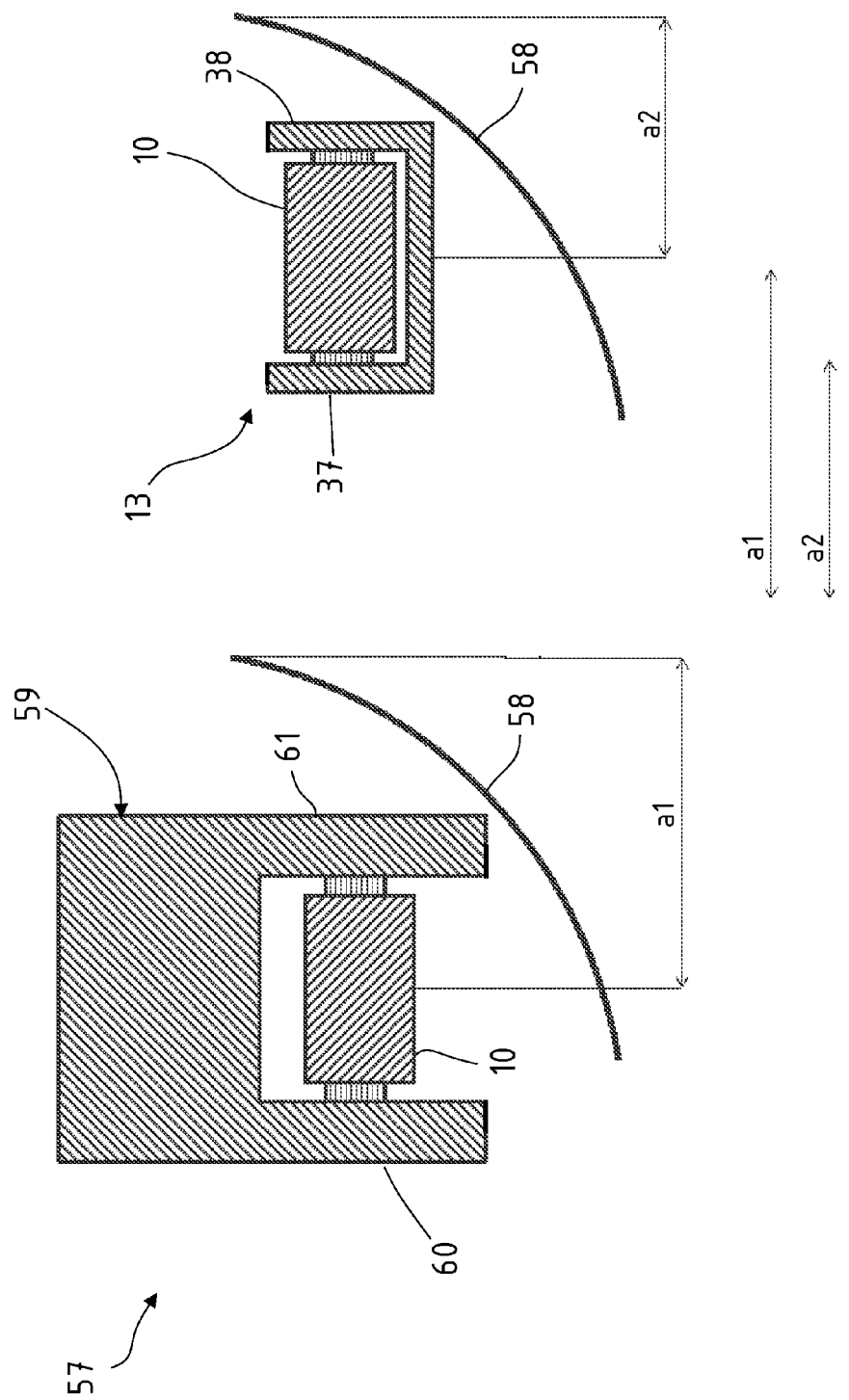
FIG. 12 shows, again in schematic and technically highly simplified form, a comparison of a wheel carrier with a conventional link attachment and a wheel carrier with a link attachment according to the invention.

FIG. 12 illustrates the structural space advantages of a link attachment 7 designed according to the invention for the spring link 3 on the wheel carrier 1 in relation to a conventional attachment. A link attachment 7 designed according to the invention for the spring link 3 is illustrated in the right-hand half of the figure. A conventional link attachment 57 is illustrated on the left-hand half of the figure. The reference sign 58 denotes the wheel rim in each case.

Conventionally, the wheel carrier 59 engages in U-shaped fashion around the end 13 of the spring link 3 with the rubber bearing 10 integrated therein. For this purpose, two limbs 60, 61 are required on the wheel carrier 59. This leads to geometric limitations because the construction must be such that the wheel carrier 59 does not make contact with the wheel rim 58. The distance from the center of the bearing 10 to the outer circumference of the wheel rim 58 is denoted by a1.

In the case of the link attachment 7 according to the invention, the end 13 of the spring link 3 engages around the bearing receptacle 34 with the bearing 10 integrated therein. The limbs 37, 38 of the spring link 3 extend in each case to the left and to the right of the face sides of the bearing 10. The distance from the center of the bearing 10 or the end 7 of the spring link 3 to the outer circumference of the wheel rim 58 is a2. It can be seen that the distance a2 is smaller than the distance a1. This fact makes it possible for the spring link 3 to be relocated yet further outward in the vehicle X direction. The geometric structural space advantages are furthermore contributed to in that the limbs 37, 38 of the spring link 3 are designed to be much thinner than the limbs 60, 61 on the wheel carrier 59, which must have a certain thickness for stiffness reasons.

Since the structural space at the interface between the wheel carrier 1 and spring link 3 is made more compact, the link attachment 7 can be relocated further outward in the vehicle X direction. As a result, the coupling length a3 (in this regard, see FIG. 6) between the spring link 3 and the camber link 4 is made greater, and thus also the lever arm is increased without the wheel carrier 1 making contact with wheel rim 58. In this way, the stiffness of the wheel carrier 1 is increased.

Figure 7:
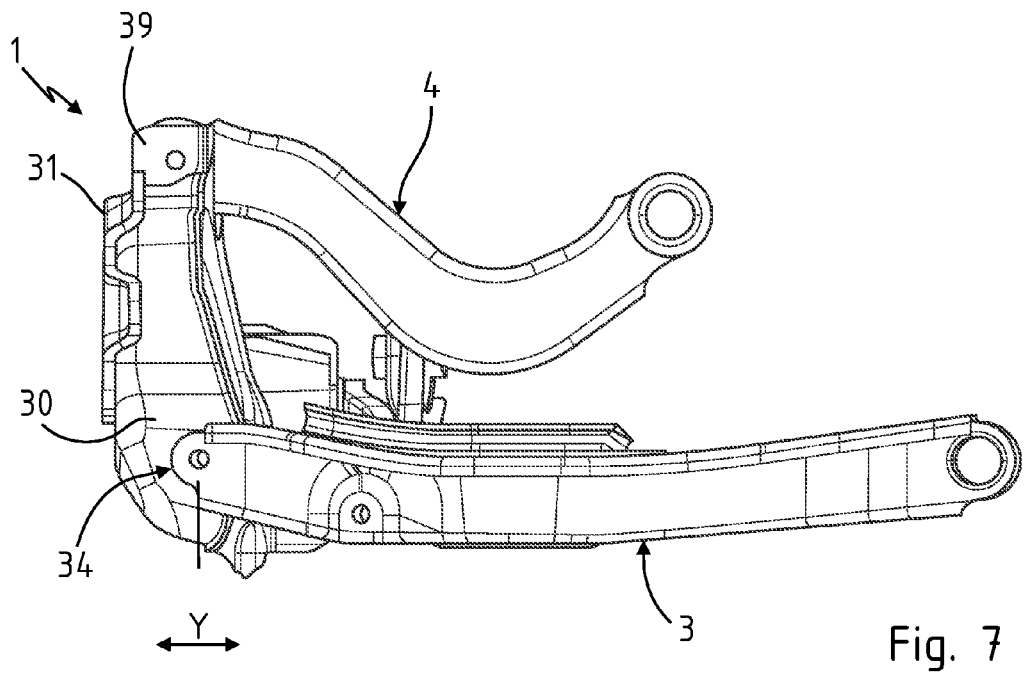
Figure 8:
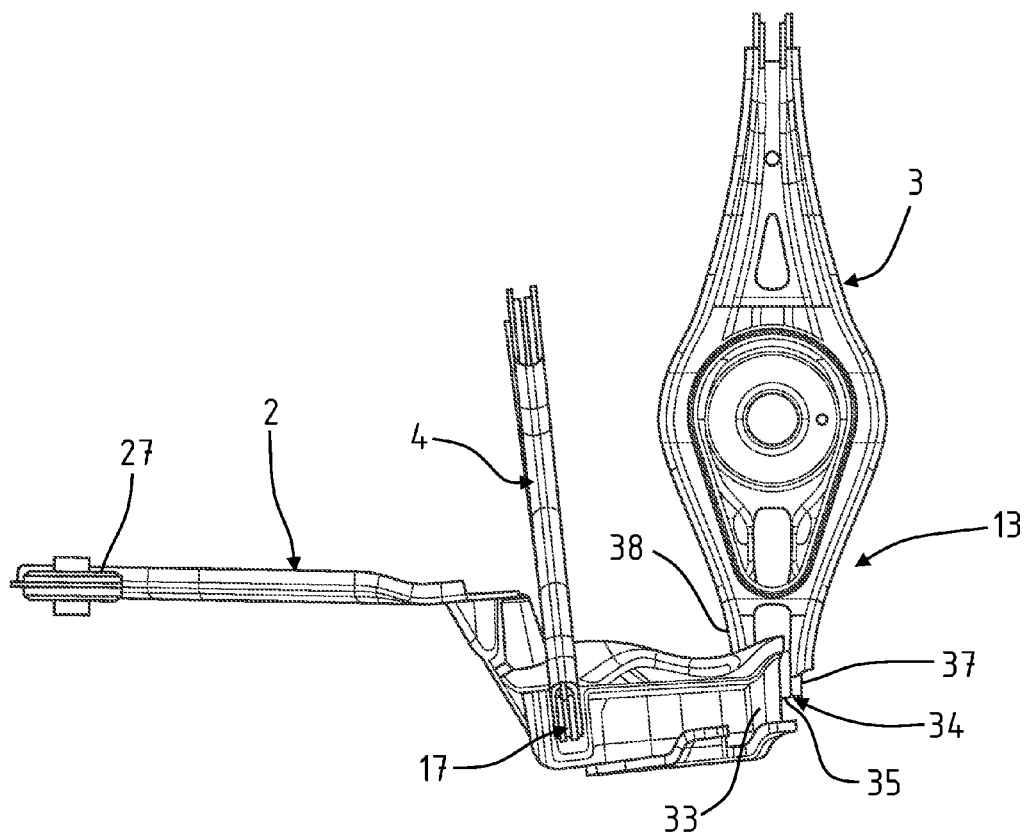

It is clear from FIG. 7 that it is also possible to easily set different track widths. This is realized through the selection of the attachment point for the position of the bearing receptacle 34 in the vehicle Y direction in the side wall 30 of the wheel carrier 1. For this purpose, the side wall 30 is punched, and provided with the opening 36 or the rim hole 54 required for receiving the bearing 10 or the sleeve 35, at the corresponding location.

LIST OF REFERENCE SIGNS

1—Wheel carrier
2—Trailing link
3—Spring link
4—Camber link
5—Toe link
6—Attachment
7—Link attachment
8—Link attachment
9—Link attachment
10—Bearing
11—Bearing
12—Bearing
13—End of 3
14—End of 4
15—End of 5
16—Bearing attachment
17—Bearing attachment
18—Bearing attachment
19—End
20—End
21—End
22—Bearing attachment
23—Bearing attachment
24—Bearing attachment
25—End
26—Bearing attachment
27—Bearing
28—Shell body
29—Base
30—Side wall
31—Wheel fastening
32—Side
33—Cover plate
34—Bearing receptacle
35—Sleeve
36—Opening
37—Limb
38—Limb
39—Limb
40—Limb
41—Bearing bore
42—Limb
43—Limb
44—Recess
45—Recess
46—Recess
47—Interior
48—Wall section
49—End
50—Support wall
51—Weld spot
52—End
53—Opening
54—Rim hole
55—Opening
56—Collar
57—Link attachment
58—Wheel rim
59—Wheel carrier
60—Limb
61—Limb
a1—Distance
a2—Distance
a3—Coupling length

The invention claimed is:

1. A wheel suspension apparatus for a motor vehicle, comprising:
   a wheel carrier having a shell body;
   the shell body have a base and a side wall bounding an opening;
   at least one link having a first end;
   the wheel carrier includes a plurality of link attachment points on the side wall of the shell body;
   a cover plate having at least one recess;
   the cover plate is fastened to the shell body and attached to the plurality of link attachment points substantially covering the opening;
   each link attachment point having a bearing receptacle;
   a bearing is disposed within at least one of the bearing receptacles; and,
   wherein the first end of the at least one link is configured to extend through the at least one recess and to be attached to one of the plurality of link attachment points and pivotally movable around the bearing in the bearing receptacle.

2. The wheel suspension apparatus of claim 1, wherein said at least one link is a plurality of links.

3. The wheel suspension as claimed in claim 1, wherein the bearing receptacle is a sleeve.

4. The wheel suspension as claimed in claim 1, wherein the bearing receptacle is formed by a rim hole formed in the side wall.

5. The wheel suspension as claimed in claim 1, wherein said bearing is a rubber bearing.

6. The wheel suspension as claimed in claim 1, wherein the at least one link attachment point has two limbs which project from the side wall and between which said first end of the at least one link is received by way of said bearing.

7. The wheel suspension as claimed in claim 1, wherein a wheel fastening apparatus is attached to the outside of the base of the shell body.

* * * * *